(12) United States Patent
Mahamkali et al.

(10) Patent No.: US 10,716,027 B1
(45) Date of Patent: Jul. 14, 2020

(54) EXTENDING AIRTIME FAIRNESS IN WLANS (WIRELESS LOCAL ACCESS NETWORKS) WITH SELECTIVE DYNAMIC ALLOCATION OF QUANTUM

(71) Applicant: Fortinet, Inc., Sunnyvale, CA (US)

(72) Inventors: Ravikiran Mahamkali, Bangalore (IN); Lakshmi Narayana Dronadula, Munnekolala (IN)

(73) Assignee: Fortinet, Inc., Sunnyvale, CA (US)

( * ) Notice: Subject to any disclaimer, the term of this patent is extended or adjusted under 35 U.S.C. 154(b) by 5 days.

(21) Appl. No.: 16/236,641

(22) Filed: Dec. 31, 2018

(51) Int. Cl.
*H04W 28/02* (2009.01)
*H04L 12/26* (2006.01)
*H04W 80/10* (2009.01)
*H04L 12/851* (2013.01)
*H04W 84/12* (2009.01)

(52) U.S. Cl.
CPC ....... *H04W 28/0268* (2013.01); *H04L 43/028* (2013.01); *H04L 47/2433* (2013.01); *H04W 80/10* (2013.01); *H04W 84/12* (2013.01)

(58) Field of Classification Search
CPC . H04W 28/0268; H04W 80/10; H04W 84/12; H04L 43/028; H04L 47/2433
See application file for complete search history.

(56) References Cited

U.S. PATENT DOCUMENTS

2017/0366467 A1* 12/2017 Martin ................ H04L 47/6265

* cited by examiner

*Primary Examiner* — Jianye Wu
(74) *Attorney, Agent, or Firm* — Law Office of Dorian Cartwright; Dorian Cartwright

(57) ABSTRACT

A set of priority parameters for network traffic on the data communication network is stored. Based on a specific application determination, based at least in part on a source IP address, a source port address, a destination IP address, a destination port address and a protocol, an airtime fairness ratio (ATR) for the session with a specific station from the set of priority parameters concerning application priority is assigned. A higher ATR results in more packets being stored in the queue for processing and a lower ATR results in fewer packets being stored in the queue for processing, thereby affecting airtime.

9 Claims, 5 Drawing Sheets

US 10,716,027 B1

EXTENDING AIRTIME FAIRNESS IN WLANS (WIRELESS LOCAL ACCESS NETWORKS) WITH SELECTIVE DYNAMIC ALLOCATION OF QUANTUM

FIELD OF THE INVENTION

The invention relates generally to computer networking improvements, and more specifically, to extending airtime fairness in WLANS (wireless local access networks) with selective dynamic allocation of quantum.

BACKGROUND

Wi-Fi standards continually evolve from legacy protocols such as IEEE (Institute of Electrical and Electronic Engineers) 802.11a, IEEE 802.11b and IEEE 802.11g to newer protocols such as IEEE 802.11n and IEEE 802.11 ac. To this end, wireless stations leveraging newer protocols are able to receive better network performance due to higher throughput and other improved conditions.

Problematically, access points serving a heterogeneous mix of legacy wireless stations and newer wireless stations are slowed down by the legacy devices. To overcome this issue, many wireless vendors implemented airtime fairness in a vendor-specific manner for clients. One common technique is to allocate a time slot, or a quantum (measured in micro seconds), to for channel access to each wireless station. The quantum is typically equal and constant for each client, allowing faster clients to have higher throughput within the quantum. On the other hand, there is no discrimination between different wireless stations.

Therefore, what is needed is a robust technique for extending airtime fairness in WLANS with selective dynamic allocation of quantum. Allocations can be based on, for example, applications in use, location, and roles and privileges.

SUMMARY

These shortcomings are addressed by the present disclosure of methods, computer program products, and systems for extending airtime fairness in WLANS with selective dynamic allocation of quantum.

In one embodiment, a set of priority parameters for network traffic on the data communication network is stored. Network packets associated with a plurality of sessions for network applications executing on the plurality of stations are received at a network interface of the access point and stored in a queue.

In another embodiment, a specific application associated with a specific session of the network packets locally at the access point without deep packet inspection is determined. The specific application determination is based at least in part on a source IP address, a source port address, a destination IP address, a destination port address and a protocol. Based on the specific application determination, in one implementation, an airtime fairness ratio (ATR) for the session with a specific station from the set of priority parameters concerning application priority is assigned. A higher ATR resulting in more packets being stored in the queue for processing and a lower ATR resulting in fewer packets being stored in the queue for processing. Then network packets for the specific session of an application are processed using packets in the queue.

Advantageously, computer hardware performance is improved and network performance is improved by the airtime fairness techniques.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for extending airtime fairness in WLANS with selective dynamic allocation of quantum. One of ordinary skill in the art will recognize that many other scenarios are possible, given the present disclosure, as discussed in more detail below.

I. Systems to Prevent Extend Airtime Fairness in WLANS (FIGS. 1-2)

Figure 1:
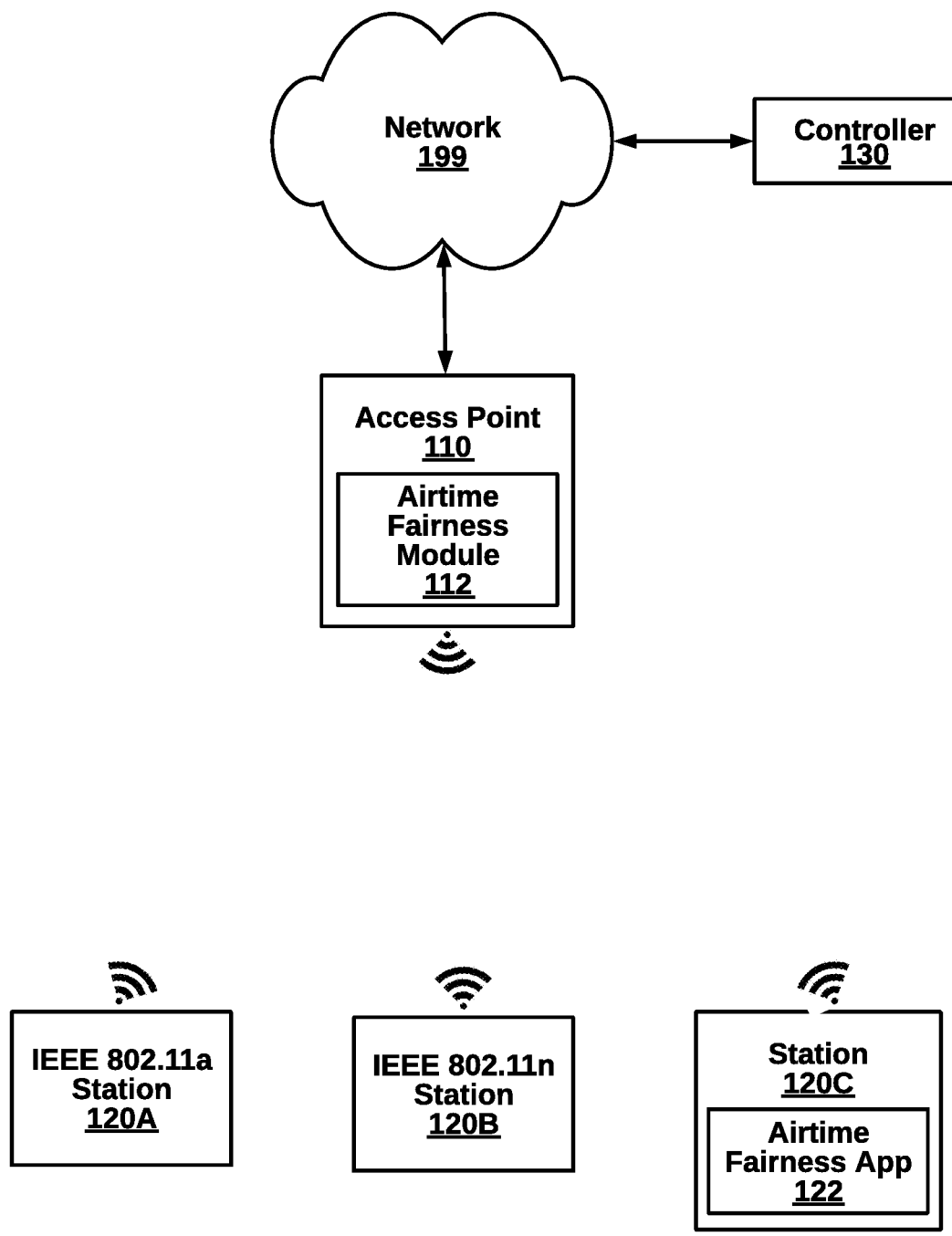
FIG. 1 is a high-level block diagram illustrating a system to extend airtime fairness in WLANS with selective dynamic allocation of quantum, according to one embodiment.
Figure 2:
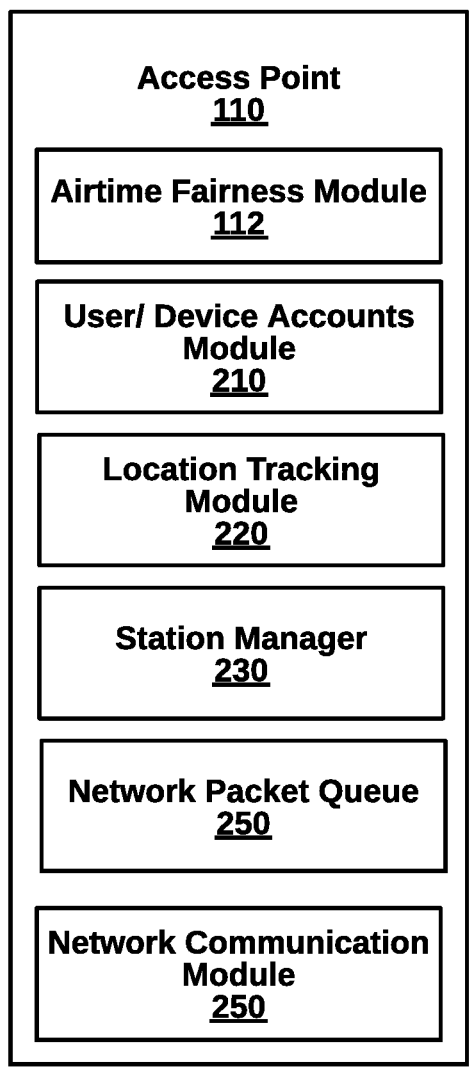
FIG. 2 is a more detailed block diagram illustrating internal components of an access point from the system of FIG. 1, according to some embodiments.

FIG. 1 is a high-level block diagram illustrating a system 100 to extend airtime fairness in WLANS with selective dynamic allocation of quantum (ATR), according to one embodiment. The system 100 comprises an access point 110, wireless stations 120A-C, and controller 130. Many other configurations are possible. For example, additional network components can also be part of the system 100, such as firewalls, virus scanners, routers, switches, application servers, databases, and the like. Each of the components in the system 100 are communicatively coupled through the network 199.

Network 199 can be the Internet, a WAN, a LAN, a Wi-Fi, or other type of data communication network providing a data channel for components of the system 100. Control of the network can be by a business organization, a government agency, or an individual household, without limitation to other possibilities. The components can use data channel protocols, such as IEEE 802.11a/b/g/, IEEE 802.11 n, 802.11ac, or other versions of the 802.11 and other wireless standards. Referring specifically to FIG. 1, the access point 110 is coupled across the network 199 preferably over wired connections. In turn, the stations 120A-C are coupled to the access point 110, preferably over wireless connections.

The access point 110 further comprises an airtime fairness module 112 to modify airtime fairness (ATR) within sessions of network packets. Without using DPI (deep packet inspection), the airtime fairness module 112 is able to identify applications and users from the network packets.

The airtime fairness module 112 selectively adjusts quantum for a device, for an application, for a user, or for a far-away device, as non-limiting examples. The adjustments can be based on organizational priorities set to define treatment based on a client's application, location, and/or roles and privileges.

In one implementation, there are no adjustments made to default airtime fairness parameters for a guest user or for an unknown device (e.g., clients get equal preference in airtime). On the other hand, a president of an entity, a senior network administrator performing a critical task, or certain types of devices can be given the best possible network privileges, using adjustments to airtime fairness parameters for the identified characteristic. One embodiment downgrades airtime fairness based on the identified characteristic by reducing airtime through less favorable airtime fairness parameters (e.g., ATR downgraded for social media applications).

In one embodiment, the access point 110 off-loads airtime fairness determinations to the controller 130. From the perspective of the controller 130, performing airtime fairness determinations for multiple access points allows uniform implementation of network policies with standardized decision logic. In addition to the access point 110, there can be several other access points under management of the controller 130. By having contact with multiple access points, the controller 130 is able to track a specific user or a specific device as it moves around different rooms in a building services by different access points. The controller 130 can ensure consistent airtime performance (e.g., ATR) throughout the changes in location.

Figure 5:
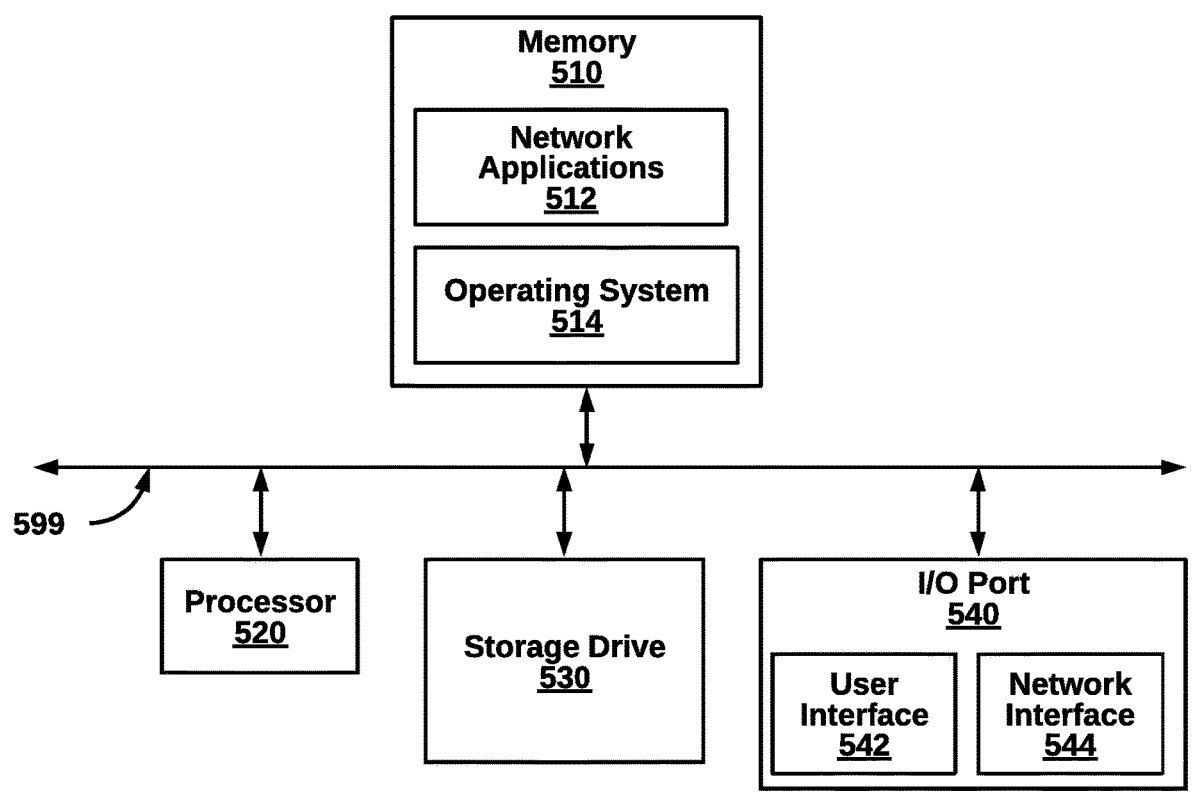
FIG. 5 is a block diagram illustrating an example computing device, according to one embodiment.

The access point 110 physically includes one or more individual access points implemented in any of the computing devices discussed herein (e.g., see FIG. 5). For example, the access point 110 can be an AP 110 or AP 433 (modified as discussed herein) by Fortinet, Inc. of Sunnyvale, Calif. A network administrator can strategically place the access point 120 for optimal coverage area over a locale. The access point 120 can, in turn, be connected to a wired hub, switch or router connected to the enterprise network 199 (or an external network). In embodiment, access point functionality is incorporated into a switch or router. In another embodiment, the access point 110 is a virtual device in whole or in part. Further embodiments of the access point 110 are discussed with respect to FIG. 2.

The controller 130 manages the access point 110 and controls stations as they traverse around the network. In one embodiment, a QoS is determined for a particular station while connected to access point 110 and continues to be the QoS when the same station subsequently associates with access points other than the access point 110.

One station, IEEE 802.11a station 130A is typically limited in throughput by the protocol itself. Another station, IEEE 802.11n station 130B has a relatively faster throughput. Yet another station, station 130C includes Additionally, the stations 130A-C of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5). No client configuration or download is needed for this particular technique, although a client app can be downloaded for optimizations.

FIG. 2 is a more detailed block diagram illustrating the airtime fairness module 112 of the system 100, according to one embodiment. The access point 110 comprises the airtime fairness module 112, user/device accounts module 210, network packet queue 220, station manager 230, network communication module 240.

The airtime fitness module 112 can be implemented, in part, by a specialized ASIC or other computer hardware that is optimized for airtime fairness determinations. In an embodiment, an operating system of the access point 110 is updated with a patch to implement airtime fairness determination. In another embodiment, a separate airtime fitness server (not pictured) is in communication with the access point 110.

The location tracking module 330 determines and tracks locations of users and devices. In some cases, users log on from a known location (e.g., Chicago O'Hare Airport, a certain university network, a specific coffee shop. In other cases, user location can be determined from IP address, or other data exposed by DPI. In some embodiments, devices are tracked independent of specific users. These locations can be sent as inputs to the airtime fairness module 112. As a result, many different policies can be implemented. For instance, closer devices may be given shorter airtime than far away devices, due to an increased flight time for network packets. In one embodiment, a location history is stored for individual IoT apparatus and for specific users in a relational database.

The network communication module 250 includes APIs, networking software and hardware ports and protocols, and radios needed to communicate with access points, stations, external databases and severs, and the like.

II. Methods for Extending Airtime Fairness in WLANS (FIGS. 3-4)

Figure 3:
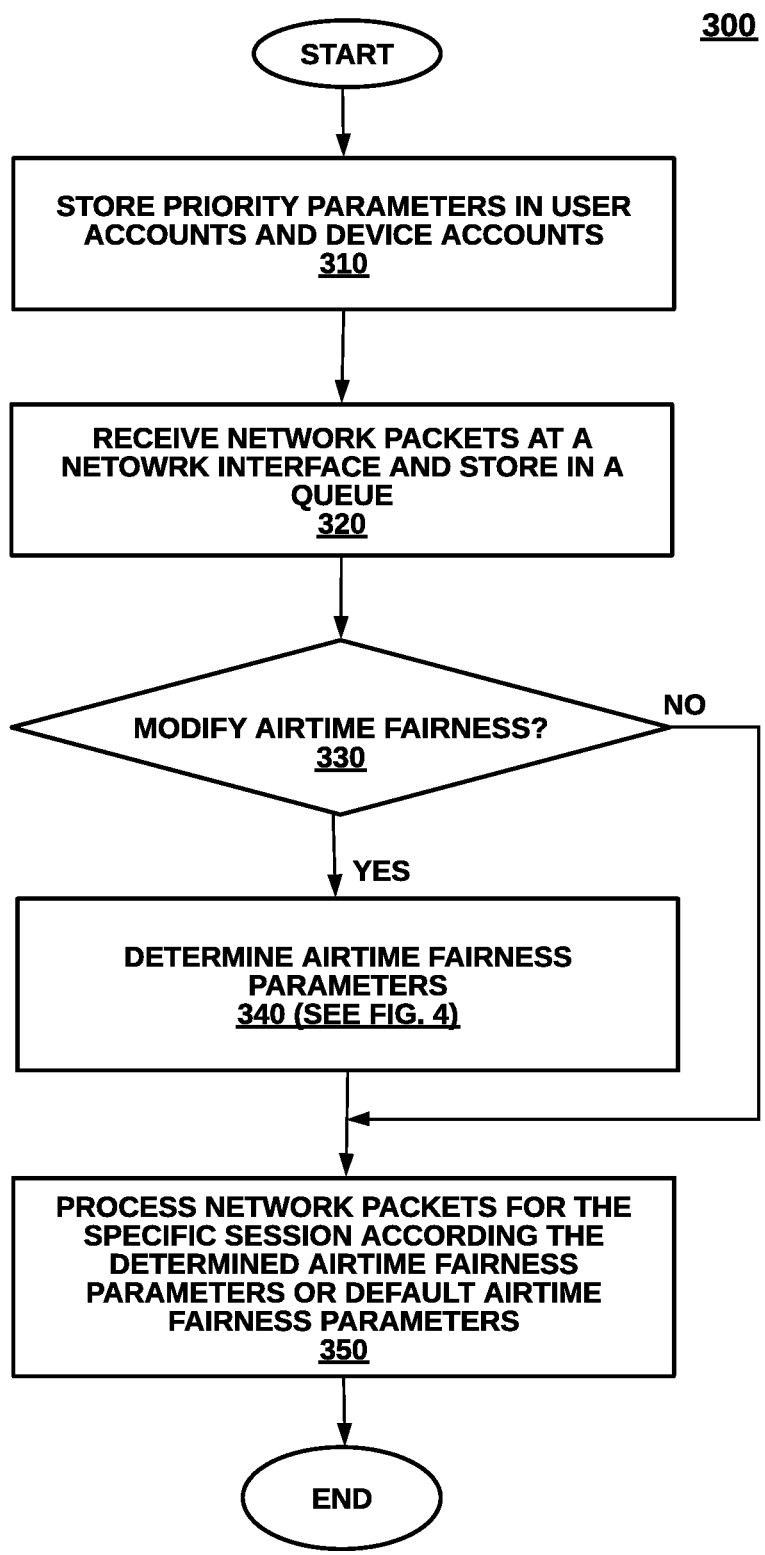
FIG. 3 is a high-level flow diagram illustrating a method for extending airtime fairness in WLANS with selective dynamic allocation of quantum, according to one embodiment.
Figure 4:
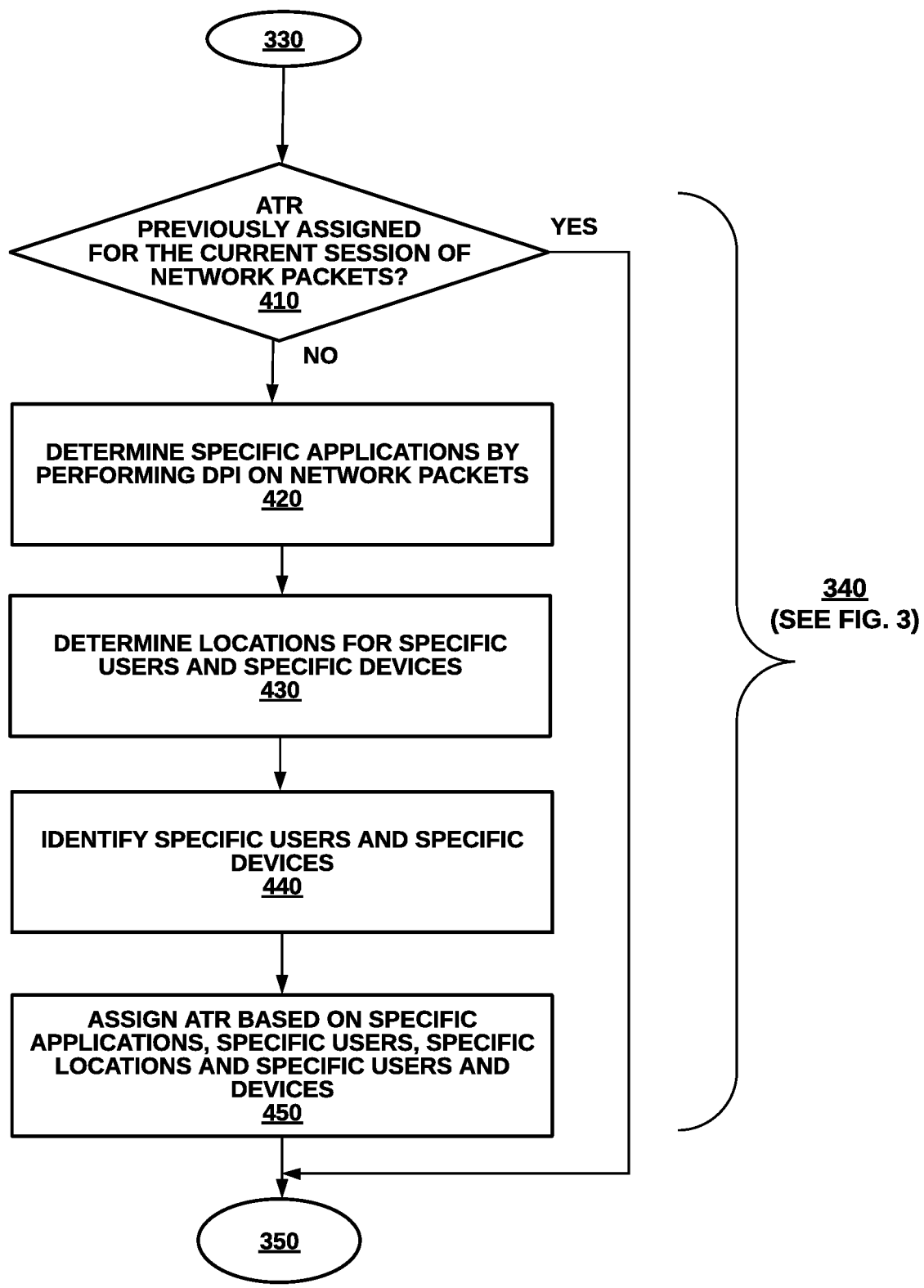
FIG. 4 is a more detailed flow diagram illustrating a step for selectively determining an ATR for quantum of a specific session with a specific wireless station used by a specific user, from the method of FIG. 3, according to one embodiment.

FIG. 3 is a high-level flow diagram illustrating a method 300 for extending airtime fairness in WLANS with selective dynamic allocation of quantum, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310, a set of priority parameters is stored for network traffic on the data communication network.

At step 320, network packets are received at a network interface of the access point and stored in a queue of the access point. The network packets associated with a plurality of sessions for network applications executing on the plurality of station.

At step 330, it is determined whether or not to modify airtime fairness. When bypassed, network resources are conserved. When in operation, only certain devices, users, or locations may receive premium network services. Others may receive defaults network services, and thus, no modification of airtime fairness is performed.

At step 340, airtime fairness is determined utilizing selective dynamic allocation of quantum, as set forth in more detail below with respect to FIG. 4.

At step 350, network packets for the specific session of an application are processed using packets in the queue.

FIG. 4 is a more detailed flow diagram illustrating the step 330 for selectively determining an ATR for quantum of a specific session with a specific wireless station used by a specific user, from the method of FIG. 3, according to one embodiment.

At step 410, if an ATR has already been assigned, the following steps can be bypassed, saving computing resources and time. In some embodiments, an ATR can be updated for a new session of the same device, a new user of the same device, or the same users on different devices, for instance.

At step 420, a specific application associated with a specific session of the network packets locally at the access point without deep packet inspection is determined. The specific application determination is based at least in part on a source IP address, a source port address, a destination IP address, a destination port address and a protocol. Advantageously, the process operates more efficiently to speed up computer hardware and computer networking.

At step 430, locations for specific users and specific devices are determined. The specific technique is implementation-specific, but can be based on GPS coordinates, IP address, and the like.

At step 440, specific users and specific devices are identified. Users can be determined, for example, from log on information or by correlating an IP address used previously. Devices can be determined by MAC address or GPS coordinates, for example.

At step 450, based on the specific application determination, an airtime fairness ratio (e.g., ATR) is assigned for the session with a specific station from the set of priority parameters concerning application priority. A higher ATR results in more packets being stored in the queue for processing and a lower ATR results in fewer packets being stored in the queue for processing.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the access point 110 and the wireless stations 120A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the access point 110 and the wireless stations 120A-C, as illustrated in FIGS. 1-2. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 10, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point coupled to a plurality of stations on a data communication network, the method for pre-processing adjustments in airtime fairness for improved packet prioritizing during packet processing, and the method comprising:
   storing a set of priority parameters for network traffic on the data communication network;
   receiving network packets, at a network interface of the access point, the network packets associated with a plurality of sessions for network applications executing on the plurality of stations, the network packets stored in a queue;
   determining a specific application associated with a specific session of the network packets locally at the access point without deep packet inspection, the specific application determination based at least in part on a source IP address, a source port address, a destination IP address, a destination port address and a protocol;
   based on the specific application determination, assigning an airtime fairness ratio (ATR) for the session with a specific station from the set of priority parameters concerning application priority, a higher ATR resulting in more packets being stored in the queue for processing and a lower ATR resulting in fewer packets being stored in the queue for processing; and
   processing network packets for the specific session of an application using packets in the queue.

2. The method of claim 1, wherein network packet processing comprises:
   assigning a processing priority to the specific session based on a characteristic of the network packets; and
   processing network packets for the session according to the processing priority.

3. The method of claim 1, wherein assigning the ATR further comprises:
   identifying a user from network log-in data;
   determining at least one of roles and privileges associated with the user of the specific application;
   determining a priority parameter associated with the at least one of roles and privileges, wherein
   assigning the ATR comprises assigning the ATR based at least in part on the priority parameter concerning the at least one of roles and privileges from the set of priority parameters.

4. The method of claim 1, wherein assigning the ATR further comprises:
   determining a device type associated with a user of the specific application;
   determining a priority parameter associated with the device type, wherein
   assigning the ATR comprises assigning the ATR based at least in part on the priority parameter concerning the device type from the set of priority parameters.

5. The method of claim 1, wherein assigning the ATR further comprises:
   determining a location associated with a user of the specific application;
   determining a priority parameter associated with the location, wherein
   assigning the ATR comprises assigning the ATR based at least in part on the priority parameter concerning the location from the set of priority parameters.

6. The method of claim 1, further comprising:
   prior to specific application determination, assigning a default ATR for the session equal to a default ATR for all sessions.

7. The method of claim 1, further comprising:
   recognizing that deep packet inspection is necessary for the specific application determination;
   tunneling at least some of the network packets from the session to a controller for DPI; and
   receiving an identity of the specific application from the controller.

8. The method of claim 1, wherein applications more critical to an entity have a higher ATR relative to the set of priority parameters, and applications less critical to the entity have a lower ATR relative to the set of priority parameters.

9. A non-transitory computer-readable medium to, when executed by a processor, perform a computer-implemented method in a SIEM (security information and event management) system on a data communication network for detecting identity fraud from log event reporting data, the method comprising:
   storing a set of priority parameters for network traffic on the data communication network;
   receiving network packets, at a network interface of the access point, the network packets associated with a plurality of sessions for network applications executing on the plurality of stations, the network packets stored in a queue;
   determining a specific application associated with a specific session of the network packets locally at the access point without deep packet inspection, the specific application determination based at least in part on a source IP address, a source port address, a destination IP address, a destination port address and a protocol;
   based on the specific application determination, assigning an airtime fairness ratio (ATR) for the session with a specific station from the set of priority parameters concerning application priority, a higher ATR resulting in more packets being stored in the queue for processing and a lower ATR resulting in fewer packets being stored in the queue for processing; and
   processing network packets for the specific session of an application using packets in the queue.

* * * * *